(12) United States Patent
Gogo et al.

(10) Patent No.: US 6,367,255 B1
(45) Date of Patent: Apr. 9, 2002

(54) BRAKING MASTER CYLINDER AND METHOD OF MAKING A MASTER CYLINDER

(75) Inventors: Kazuhiko Gogo; Shigeto Inami; Seiji Kurimoto, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/527,267

(22) Filed: Mar. 17, 2000

(30) Foreign Application Priority Data

Mar. 19, 1999 (JP) .......................... 11-075955
May 11, 1999 (JP) .......................... 11-130268

(51) Int. Cl.⁷ .............................. B60T 11/26; F15B 7/08
(52) U.S. Cl. ...................................... 60/588
(58) Field of Search .................... 60/585, 588, 583, 60/581; 29/888.06, 527.2, 527.3, 527.5

(56) References Cited

U.S. PATENT DOCUMENTS

| | | | |
|---|---|---|---|
| 2,484,439 A | * 10/1949 | Williamson | 60/581 |
| 2,687,015 A | * 8/1954 | Edwards | 60/581 |
| 2,950,600 A | * 8/1960 | Huck | 60/585 |
| 4,122,596 A | * 10/1978 | Fields | 29/527.3 |
| 4,224,727 A | * 9/1980 | Miyashita | 29/527.5 |
| 4,544,075 A | * 10/1985 | Nakamura | 60/585 |
| 4,823,533 A | * 4/1989 | Reynolds | 60/585 |

FOREIGN PATENT DOCUMENTS

| | | | | |
|---|---|---|---|---|
| JP | 56-25045 A | * | 3/1981 | 60/588 |
| JP | 58-33565 A | * | 2/1983 | 60/588 |
| JP | 3-2962 | | 1/1991 | |
| JP | 10-236374 | | 9/1999 | |

* cited by examiner

*Primary Examiner*—Edward K. Look
*Assistant Examiner*—Igor Kershteyn
(74) *Attorney, Agent, or Firm*—Birch, Stewart Kolasch & Birch, LLP

(57) ABSTRACT

A master cylinder for braking of reduced size and complexity and a method of making a master cylinder. The master cylinder includes a sub-tank for supplying working oil for braking, the sub-tank being integrally connected to a master cylinder main body. A first port and a second port are formed close to one another in a partition wall separating the master cylinder main body from the sub-tank. The sub-tank has a first opening and a second opening. The axes of the first and second ports in the partition wall pass through the first opening in the sub-tank, which allows tools to be inserted through the first opening to form both ports.

9 Claims, 4 Drawing Sheets

BRAKING MASTER CYLINDER AND METHOD OF MAKING A MASTER CYLINDER

BACKGROUND OF THE INVENTION

1. Field of the Invention

The present invention relates to a master cylinder for braking in which a sub-tank for supplying working oil for braking is integrally provided on a master cylinder main body, and a method of making a master cylinder.

2. Background Art

A disk-type brake system is known a four-wheeled car, motorcycle, or motor-tricycle, in which a sub-tank for supplying working oil for braking is integral with a master cylinder for feeding the working oil to a caliper (see Japanese Utility Model No. Hei 3-2962, and Japanese Patent Laid-open No. Hei 10-236374).

In the master cylinder, two ports close to each other in a partition wall for partitioning the sub-tank from a master cylinder main body.

To easily form these ports by machining, the sub-tank has a large opening extending substantially over the entire length of the master cylinder main body, and a lid having a large area is mounted to cover the opening.

Since the prior art master cylinder for braking integrated with the sub-tank is configured as described above, master cylinder is large. Because a lid having a large area must be liquid-tightly mounted to cover the opening of the sub-tank, the tightly sealing structure must cover a large area, increasing cost.

An object of the present invention is to solve the above-described problem of the prior art master cylinder for braking integrated with a sub-tank, and to provide a master cylinder for braking of reduced size, complexity, and difficulty of manufacture.

SUMMARY OF THE INVENTION

The present invention satisfies the above goals and other advantages not contemplated by conventional devices. A master cylinder for braking includes a sub-tank for supplying working oil for braking integral with a master cylinder main body. A first port and a second port are formed close to each other in a partition wall for partitioning the master cylinder main body from the sub-tank so as to pass through the partition wall.

The sub-tank has a first opening and a second opening. The first opening is located at a position through which the axis of the first port and the axis of the second port pass, and the second opening is located at the highest position of the sub-tank. The working oil for braking is supplied in the sub-tank through the second opening.

As a result of the above configuration, the first and second ports can be formed by a tool inserted through the first opening, and the size of the first opening can be made relatively small. This reduces the size of the master cylinder. The seal structure can also be reduced in size and simplified, increasing the reliability of the seal. In turn this reduces difficulty of manufacture and cost.

Further, the second opening is located at the highest position (upper portion) of the sub-tank, and the working oil for braking is supplied in the sub-tank through the second opening.

As a result, because working oil for braking can be supplied at a position near the master cylinder main body for braking, it is possible to supply the working oil while checking the charging state of the working oil to the master cylinder, and hence to facilitate the supply of the working oil.

Because the port for supplying working oil for braking is directly formed in the upper end wall of the sub-tank, the number of parts necessary for supply of the working oil is minimized, and thereby the structure of the supply port can be simplified. This makes it possible to further reduce the size of the master cylinder for braking. In addition, the axis of the first port may cross the axis of the second port.

As a result, the size of the first opening can be further reduced, further reducing the size of the master cylinder for braking and the seal structure and increasing the reliability of the seal structure.

Because the axis of the first port crosses the axis of the second port (when viewed from the side), it is easy to form the two ports close to one another without impairing the strength of the partition wall.

The first opening may be provided with a window for checking a residual amount of the working oil for braking. The window can be formed by making use of the first opening provided for forming the first and second ports by machining. In other words, the first opening serves as structure for the window. As a result, it is possible to further simplify the structure of the master cylinder for braking.

The sub-tank may have a third opening at a position between the first opening and the second opening. The third opening is provided with a window for checking the residual amount of the working oil for braking.

The shape of the window provided for the third opening formed in the sub-tank can be freely selected, facilitating checking of the residual amount of working oil for braking.

The master cylinder having a sub-tank integral with a master cylinder main body may include a communication port for communicating the master cylinder main body to the sub-tank formed in the partition wall. The communication port may be formed via an opening for machining formed in a wall surface of the sub-tank, and the opening for machining blocked after formation of the communication port.

Because the opening for machining is blocked after formation of the communication port, a special seal member for the opening for machining is not required. This reduces the size of the master cylinder.

It is desirable to keep the opening for machining as small as possible, while still allowing a tool for forming the communication port to pass the opening for machining. The opening for machining is formed in a wall surface, facing to the other wall surface on the master cylinder main body side of the sub-tank. In this configuration, it is possible to easily form the communication port by machining.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
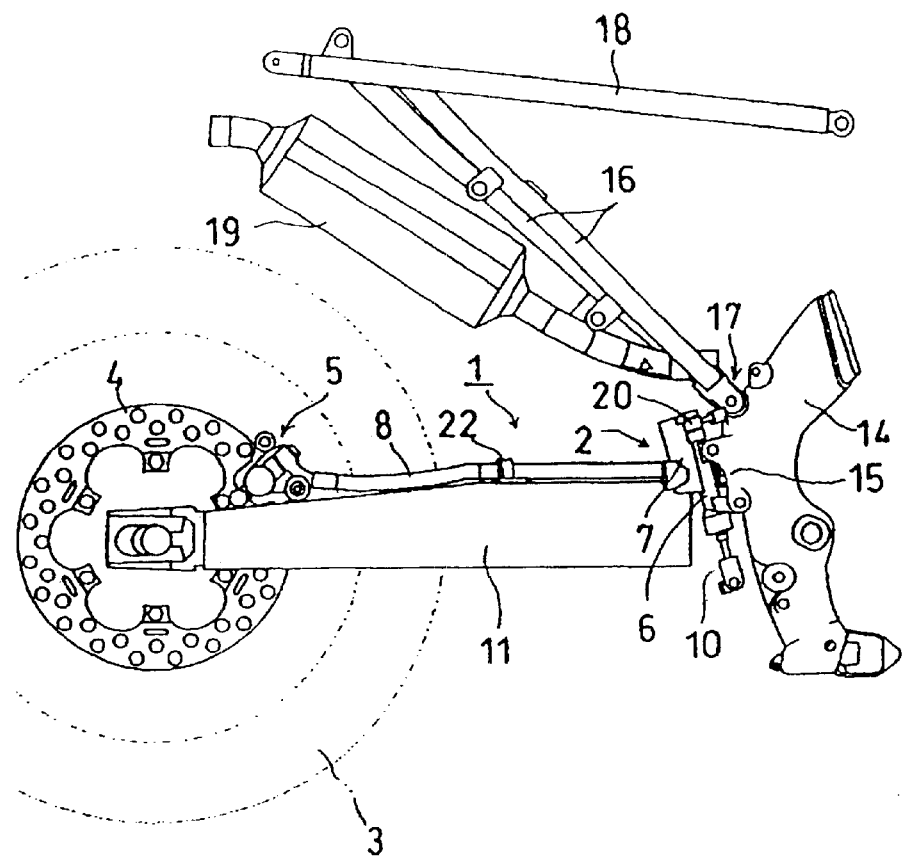
FIG. 1 is a right outer side view of a disk type brake system including a master cylinder for braking according to a first embodiment of the present invention.
Figure 2:
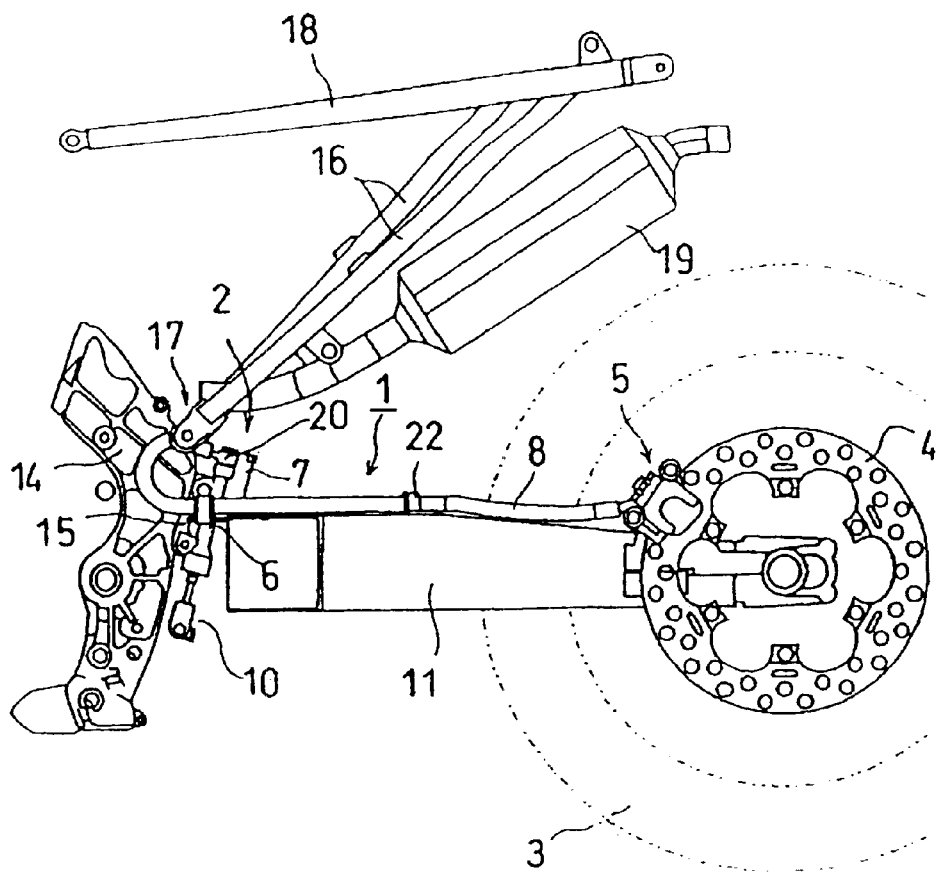
FIG. 2 is a left inner side view of a mounting structure according to the invention.
Figure 3:
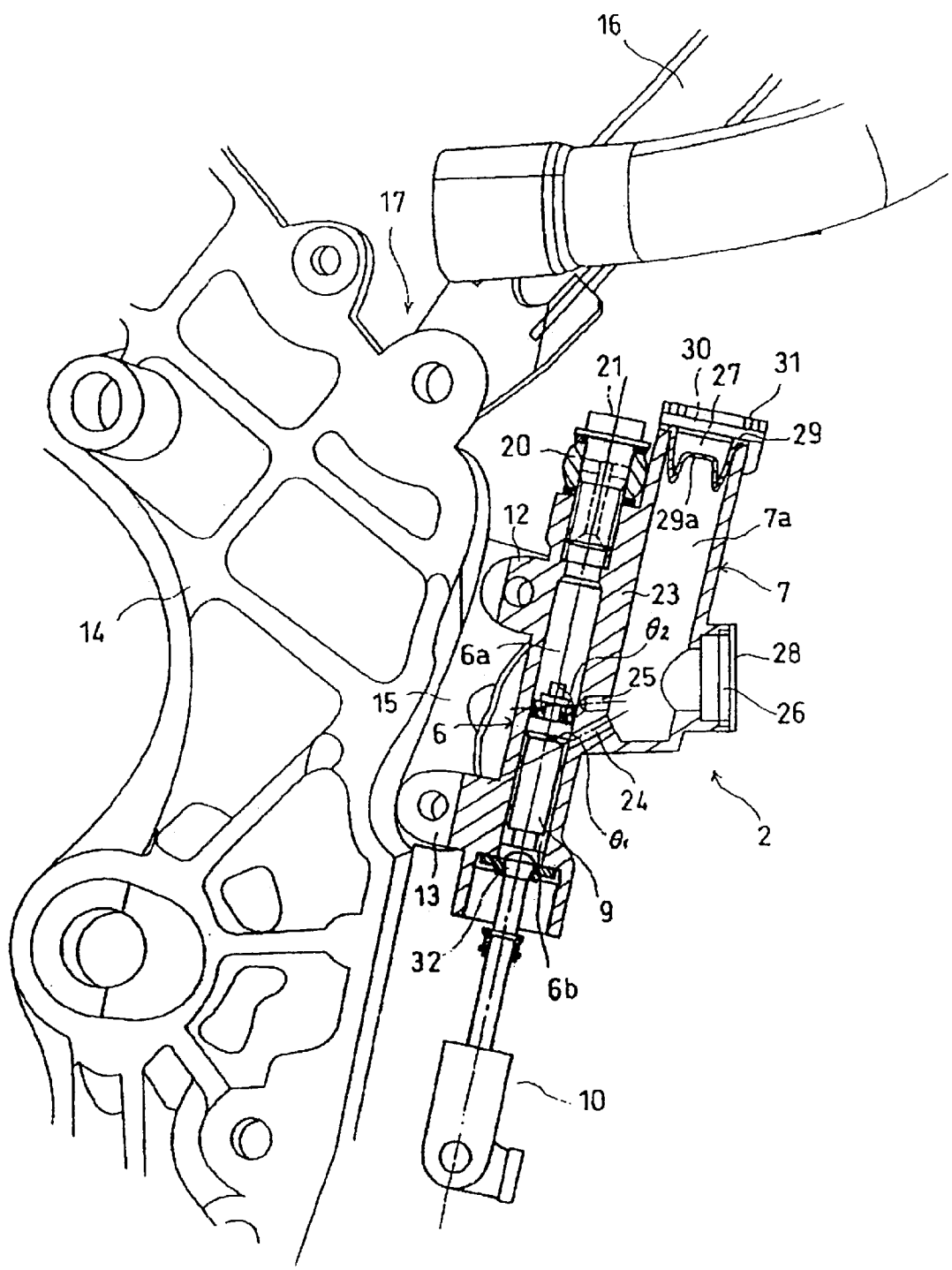
FIG. 3 is an enlarged sectional view of the master cylinder for braking according to the first embodiment of the invention.

Referring to FIGS. 1 to 3, a disk type brake system 1 to which a master cylinder 2 for braking according to the first embodiment is applied includes a brake disk 4 integrally joined to an axle of a rear wheel 3 of a motorcycle. A caliper 5 has a pair of friction pads (not shown) for clamping both side surfaces of the brake disk 4.

A master cylinder main body 6 generates a working hydraulic pressure applied to the pair of friction pads via a piston (not shown). A sub-tank 7 supplies a working oil for braking, and is integral with the master cylinder main body 6.

A brake hose 8 connects the caliper 5 to the master cylinder main body 6 for introducing the working oil from the master cylinder main body 6 to the caliper 5, and a link mechanism 10 including a brake pedal is linked to the piston 9 in the master cylinder main body 6. While not shown in detail, the caliper 5 is rigidly mounted on the rear end of a rear fork 11 with a bolt.

The master cylinder 2 includes the master cylinder main body 6 and the sub-tank 7. As shown in FIG. 3, the master cylinder main body 6 is rigidly mounted on a pivot plate 14 by connecting two brackets 12 and 13 provided on the master cylinder main body 6 to a bracket 15 provided on the pivot plate 14 by means of bolts passing through two bolt holes formed in the bracket 15. The brackets 12 and 13 may be cast with the main body and the sub-tank.

The pivot plate 14 is, as shown in FIG. 1, has an asymmetric V-shape. Referring to FIG. 1, at the central portion of a body frame of the motorcycle, an upper half (not shown) of a main frame extending rightwardly (forwardly of the vehicle), and obliquely upwardly is integrally connected to the upper end of the pivot plate 14. The lower end of a lower rear frame 16 (part of a rear frame of the vehicle) extends leftwardly (rearwardly of the vehicle) and obliquely upwardly, and is bolted to a bolt connection portion 17 provided on the asymmetric V-shaped portion of the pivot plate 14. The body frame structure is substantially symmetric in the width direction of the vehicular body. Reference numeral 18 designates an upper rear frame and 19 designates an exhaust muffler.

An eye-fixture 20 is connected to an end portion, on the master cylinder main body 6 side, of the brake hose 8. This end portion of the brake hose 8 is connected to the upper end of the master cylinder main body 6 by fastening the eye-fixture 20 to the upper end of the master cylinder main body 6 by means of a union bolt 21 passing through the eye-fixture 20. The brake hose 8 is fluidly communicated to a cylinder chamber 6a in the master cylinder main body 6 via a passage in the union bolt 21 and a passage in the eye-fixture 20.

As shown in FIG. 2, the brake hose 8 extends from the connection portion at the upper end of the master cylinder main body 6, turning from outside to inside the bolt connection portion 17 at the lower end of the lower rear frame 16, and extends rearwardly along the upper end surface of the rear fork 11. The end portion of the brake hose 8 (on the caliper 5 side) is connected to the caliper 5.

The brake hose 8 is fixed to the upper end surface of the rear fork 11 at a plurality of points by fasteners 22. When the rear fork 11 is swung in the vertical direction, the brake hose 8 can easily follow the vertical swing action of the rear fork 11 because the curved portion of the brake hose 8, which turns from outside to inside of the bolt connection portion 17 at the lower end of the lower rear frame 16, is deformed in accordance with the vertical swing action of the rear fork 11.

The detailed structure of the master cylinder 2 for braking will be described below.

Referring to FIG. 3, the master cylinder 2 for braking is mounted, via the pivot plate 14, on the body frame of the motorcycle so that the axis thereof is slightly inclined rearwardly of the vehicle (slightly rightwardly in FIG. 3). In addition, the axis may be inclined forwardly of the vehicle.

The master cylinder 2 for braking is, as described above, composed of the master cylinder main body 6 and the sub-tank 7 for supplying a working oil for braking. The master cylinder main body 6 and the sub-tank 7 may be cast as a single piece.

The sub-tank 7 is formed such that its longitudinal axis is parallel to that of the master cylinder main body 6. A working oil reservoir chamber 7a of the sub-tank 7 is phase-shifted upwardly as shown from the cylinder chamber 6a in the axial directions.

A piston 9 is slidably fitted in the cylinder chamber 6a of the master cylinder main body 6. The piston 9 is moved forward and backward via the link mechanism 10 by an operating force applied from a driver to the brake pedal. When it is required to brake the vehicle, the piston 9 is operated to press working oil in the cylinder chamber 6a, thereby feeding the working oil to the caliper 5 via the brake hose 8. Reference numeral 32 designates a universal joint for connecting the outer end of the piston 9 to the terminal of the link mechanism 10.

A partition wall 23 is provided between the master cylinder main body 6 and the sub-tank 7. A lower end portion of the partition wall 23, as shown in FIG. 3, has a first port 24 and a second port 25 formed as through-holes for communicating the inside of the master cylinder main body 6 to the inside of the sub-tank 7. The first and second ports 24 and 25 are positioned close to each other.

The first and second ports 24 and 25 are formed such that the axis of the first port 24 crosses the axis of the second port 25 in a side view. A tilt angle $\theta_1$ between the axis of the first port 24 and the axis of the cylinder chamber 6a is smaller than a tilt angle $\theta_2$ between the axis of the second port 25 and the axis of the cylinder chamber 6a ($\theta_1 < \theta_2$).

The sub-tank 7 has a first opening 26 and a second opening 27. Of these openings 26 and 27, the first opening 26 is located at the portion through which the axis of the first port 24 and the axis of the second port 25 pass. Accordingly, both the ports 24 and 25 can be formed by machining the partition wall 23 with a tool (not shown) inserted in the sub-tank 7 through the first opening 26. In addition, the first opening 26 for forming the first and second ports 24 and 25 by machining may be desirable to be made as small as possible in a range which allows the tool for forming the ports 24 and 25 to pass through the first opening 26. This configuration reduces the size of the master cylinder 2 for braking.

Because the axis of the first port 24 crosses the axis of the second port 25 (tilt angle $\theta_1$<tilt angle $\theta_2$), the two ports 24 and 25 can be easily formed at positions close to one another without excessively impairing the strength of the partition wall 23.

After formation of the first and second ports 24 and 25 by machining through the first opening 26, the first opening 26 is covered with a lid 28. While not shown in detail, the lid 28 has a window allowing a person to check the amount of working oil for braking remaining in the sub-tank 7.

The second opening 27 is formed at the highest position (the upper end in FIG. 3) of the sub-tank 7. The second opening 27 is used to newly supply working oil for braking when the remaining amount of the working oil for braking in the sub-tank is low.

The second opening 27 is usually liquid-tightly blocked by a rubber lid 29 including a diaphragm 29a, and a pressing plate 30 covered on the lid 29. These lid 29 and the pressing plate 30 are liquid-tightly fastened to an end wall of the sub-tank 7 by means of a bolt 31. The portion for blocking the second opening portion 27, in this configuration is disposed higher than a head portion of the union bolt 21.

When braking is required, the brake pedal is actuated by the driver. At this time, the piston 9 is moved forward in the cylinder chamber 6a via the link mechanism 10, to press the working oil in the cylinder chamber 6a. The working oil thus pressed is fed to the caliper 5 via the brake hose 8.

At the same time, part of the working oil is pressed back in the working oil reservoir chamber 7a of the sub-tank 7 via the second port 25. The working oil thus pressed back is absorbed by contraction of the diaphragm 29a in the working oil reservoir chamber 7a, and also absorbed by the flow of the working oil in an oil chamber 6b behind a large-diameter head portion of the piston 9 via the first port 24.

In this way, the pressing action due to the working oil in the cylinder 6a by the piston 9 is damped. As a result, the initial braking action of the disk type brake system 1, which is caused when both the side surfaces of the brake disk 4 are clamped by the pair of friction pads in the caliper 5, is moderated. The damping action increases the safety of the brake system.

When the piston 9 is further moved forward in the cylinder chamber 6a until the second port 25 is blocked by the piston 9, the pressing action of the working oil in the cylinder chamber 6a by the piston 9 is increased to the maximum value, and the working oil thus pressed is all fed to the caliper 5 via the brake hose 8. At this time, the braking action of the brake system is fully exerted.

The master cylinder for braking according to the first embodiment has the following effects:

The first opening 26 formed in the sub-tank 7 is formed at a position through which the axes of the first and second ports 24 and 25 pass. This allows formation of the first and second ports 24 and 25 by a tool inserted through the first opening 26, the size of the first opening 26 can be made relatively small, reducing the size of the master cylinder 2.

Because the size of the first opening 26 can be made relatively small, the seal structure for blocking the first opening 26 with the lid 28 can be small and simplified, increasing the reliability of the seal. Since the master cylinder 2 can be reduced in size, the seal structure can be further simplified, and master cylinder 2 for braking can be easily manufactured.

Because the axis of the first port 24 crosses the axis of the second port 25, it is possible to make the size of the first opening 26 smaller. Further, it is possible to easily form the two ports 24 and 25 at positions close to each other without impairing the necessary strength of the partition wall 23.

The second opening 27 for supplying working oil for braking is formed at the highest position (upper end) of the sub-tank 7. As a result, it is possible to supply the working oil while checking the charging state of the working oil to the master cylinder 2, to facilitate the supply of the working oil.

Because the port for supplying working oil for braking is directly formed in the upper end wall of the sub-tank 7, the number of parts necessary for supply of the working oil is minimized, and thereby the structure of the supply port can be simplified. This makes it possible to further reduce the size of the master cylinder 2.

The first opening 26 is covered with the lid 28 having a window for checking the residual amount of working oil for braking. This means that the window for checking the residual amount of working oil for braking can be formed by making use of the first opening 26. As a result, it is possible to further simplify the structure of the master cylinder 2 for braking.

In the first embodiment, the disk type brake system to which the master cylinder 2 for braking is applied is mounted on the rear wheel side of the motorcycle; however, the present invention is not limited thereto. Such a disk type brake system can be applied to a motor-tricycle or four-wheel car, and can be mounted on the front wheel side.

A second embodiment of the invention will not be described with reference to FIG. 4.

Figure 4:
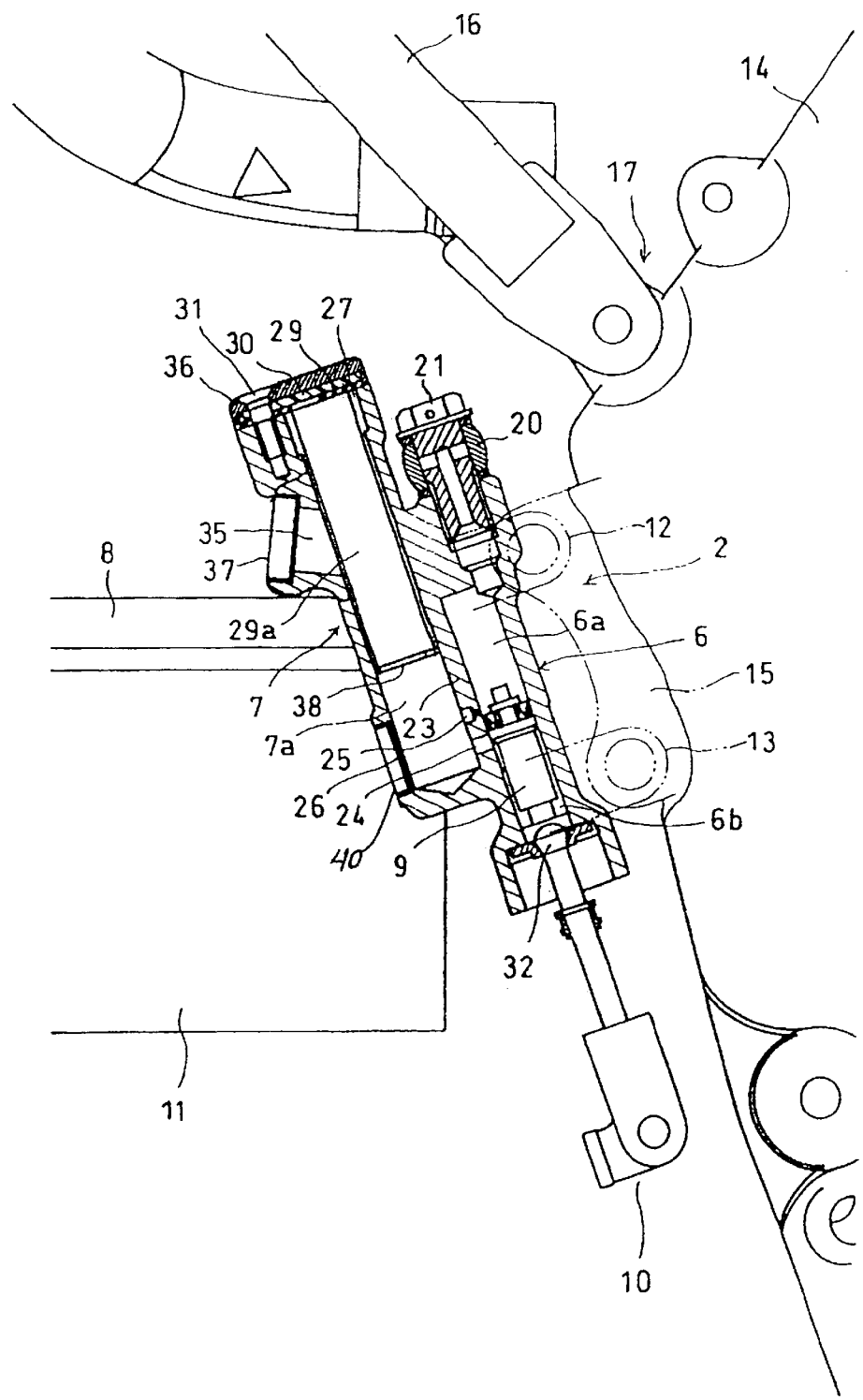
FIG. 4 is a sectional view of a master cylinder for braking according to a second embodiment of the present invention.

FIG. 4 is a sectional view of a master cylinder for braking according to the second embodiment, in which the master cylinder is mounted in the same posture as that of the master cylinder shown in FIG. 1. It should be noted that parts corresponding to the master cylinder for braking in the first embodiment are designated by the same reference signs.

As shown in FIG. 4, the master cylinder 2 for braking in the second embodiment is configured such that first and second ports 24 and 25 are formed with their axes arranged in parallel to each other and a first opening 26 is provided in an outer wall surface of a sub-tank 7 so as to face to these ports 24 and 25. Accordingly, these ports 24 and 25 can be formed in a partition wall 23 by a tool (not shown) inserted through the first opening 26.

It is desirable to make the first opening 26 as small as possible within a range allowing the tool to pass through the first opening 26. After formation of the ports 24 and 25, the first opening 26 is covered with a lid 28.

A third opening 35 is further formed in the sub-tank 7 at an intermediate position between the first and second openings 26 and 27. The third opening 35 is used for providing a window 37 for checking the residual amount of working oil for braking.

The axis of a union bolt 21 is slightly shifted in the direction opposed to the side on which the sub-tank 7 is integrally provided on a master cylinder main body 6. With this configuration, it is possible to ensure a space for containing a mounting portion of a brake hose 8 and to facilitate the work of fastening the union bolt 21.

A diaphragm 29a portion of a rubber lid 29 for blocking the second opening 27 of the sub-tank 7 is enlarged to extend up to the lower half of a working oil reservoir chamber 7a of the sub-tank 7. An oil separator 38 for separating bubbles from working oil is fixed to the lower end of the diaphragm 29a.

While not shown in detail, the inside of the diaphragm 29a is communicated to the external via a passage formed in a wall portion of the lid 29, a passage formed in a pressing plate 30 (made from resin) for pressing the lid 29, and a through-hole formed in an outer annular wall of a cap 36 put on the pressing plate 30. The diaphragm 29a thus performs a respiratory action of expansion/contraction each time the working oil flows in or out of the working oil reservoir chamber 7a. The lid 29, pressing plate 30, and cap 36 are liquid-tightly fastened to an end wall of the sub-tank 7 by means of a bolt 31.

The second embodiment is otherwise similar to the first embodiment, and therefore, a description of common elements is omitted.

The master cylinder for braking according to the second embodiment has the following effects:

The third opening 35 is formed in the sub-tank 7 at the position between the first and second openings 26 and 27, and is provided with the window 37 for periodically checking the residual amount of working oil for braking. Because the position and the shape of the window 37 provided for the third opening 35 formed in the sub-tank 7 can be freely selected, it is easy to periodically check the amount of oil present.

The first and second ports 24 and 25 for communicating the cylinder chamber 6a or oil chamber 6b of the master cylinder main body 6 to the working oil reservoir chamber 7a are formed by machining via the first opening 26, and after formation of the first and second ports 24 and 25, the first opening 26 is blocked with a blind plug 40 or the like. As a result, the size of the first opening 26 for forming the first and second ports 24 and 25 can be reduced. Further, since the first opening 26 is blocked after formation of these ports 24 and 25, a special seal member is not required for the first opening 26. This allows further reduction in size of the master cylinder 2 for braking and facilitates manufacture.

Because the first opening portion 26 for forming the ports 24 and 25 by machining is formed in the wall surface, facing to the wall surface on the master cylinder main body 6 side (that is, the wall surface of the partition wall 23), of the sub-tank 7, it is possible to easily form the ports 24 and 25 by machining via the first opening 26.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A master cylinder for braking attached to a portion of a motorcycle body frame, having a size relatively small compared to the motorcycle body frame, and comprising:
   a main body, the main body including a master cylinder chamber for receiving a piston and having a longitudinal axis inclined rearwardly from a vertical position;
   a sub-tank connected to an upper rear side of the main body, the sub-tank being displaced upwardly relative to the main body and having
      a reservoir chamber;
      a longitudinal axis substantially parallel to the longitudinal axis of the main body; and
   a partition wall between the main body and the sub-tank, the partition wall including a first port and a second port, the first and second ports providing fluid communication between the master cylinder chamber and the reservoir chamber, wherein the sub-tank is connected to the main body to supply working oil to the main body for braking,
   wherein the longitudinal axis of a union bolt which connects the end of a brake hose to the master cylinder is shifted in a direction opposed to the side on which the sub-tank is integrally provided on the master cylinder main body.

2. The master cylinder of claim 1, wherein the sub-tank and the main body are integral.

3. The master cylinder of claim 2, wherein the sub-tank and the main body form a single cast piece.

4. The master cylinder of claim 3, wherein the main body and the sub-tank are aligned substantially parallel to one another, the first opening in the sub-tank being formed on a side of the sub-tank distal to the main body.

5. The master cylinder of claim 1, wherein the sub-tank has a second opening, the second opening being directly formed at an upper portion of the sub-tank and allowing the supply of braking fluid to the reservoir chamber of the sub-tank, and the second opening being fitted with a removable liquid-blocking lid equipped with a flexible interior facing diaphragm for performing a respiratory action of expansion/contraction each time the working oil flows in or out of the sub-tank.

6. The master cylinder of claim 1, wherein the axes of the first and second ports are non-parallel.

7. The master cylinder of claim 1, wherein the axes of the first and second ports are parallel.

8. A master cylinder for braking attached to a portion of a motorcycle body frame, having a size relatively small compared to said motorcycle frame, and comprising:
   a main body, the main body including a master cylinder chamber for receiving a piston and having a longitudinal axis inclined rearwardly from a vertical position;
   a sub-tank connected to an upper rear side of the main body, the sub-tank being displaced upwardly relative to the main body and having
      a reservoir chamber;
      a first opening located at a lower end of the sub-tank, and having an aperture facing substantially horizontally; and
      a longitudinal axis substantially parallel to the longitudinal axis of the main body; and
   a partition wall between the main body and the sub-tank, the partition wall including a first port and a second port, the first and second ports providing fluid communication between the master cylinder chamber and the reservoir chamber, wherein the sub-tank is connected to the main body to supply working oil to the main body for braking, and the first and second ports in the partition wall each have an axis, the axes of the first and second ports passing through the first opening in the sub-tank,
   wherein the sub-tank includes a lid covering the first opening, the lid including a window allowing for visual inspection of a residual amount of said working oil in the reservoir chamber.

9. A master cylinder for braking attached to a portion of a motorcycle body frame, having a size relatively small compared to said motorcycle frame, and comprising:
   a main body, the main body including a master cylinder chamber for receiving a piston and having a longitudinal axis inclined rearwardly from a vertical position;
   a sub-tank connected to an upper rear side of the main body, the sub-tank being displaced upwardly relative to the main body and having
      a reservoir chamber;
      a first opening located at a lower end of the sub-tank, and having an aperture facing substantially horizontally; and a longitudinal axis substantially parallel to the longitudinal axis of the main body; and a partition wall between the main body and the sub-tank, the partition wall including a first port and a second port, the first and second ports providing fluid communication between the master cylinder chamber and the reservoir chamber, wherein the sub-tank is connected to the main body to supply working oil to the main body for braking, and the first and second ports in the partition wall each have an axis, the axes of the first and second ports passing through the first opening in the sub-tank, wherein the sub-tank includes a third opening having a window for periodically checking the working oil level in the sub-tank, the third opening positioned between the first opening and the second opening, and displaced from the second opening.

* * * * *